(12) United States Patent
Robinson et al.

(10) Patent No.: US 7,871,058 B2
(45) Date of Patent: Jan. 18, 2011

(54) DUAL INLINE SOLENOID-ACTUATED HOT MELT ADHESIVE DISPENSING VALVE ASSEMBLY

(75) Inventors: James W. Robinson, Mundelein, IL (US); C. Randolph Tiller, Glenview, IL (US); Richard L. Edwards, Cary, IL (US)

(73) Assignee: Illinois Tool Works Inc., Glenview, IL (US)

( * ) Notice: Subject to any disclaimer, the term of this patent is extended or adjusted under 35 U.S.C. 154(b) by 723 days.

(21) Appl. No.: 11/878,587

(22) Filed: Jul. 25, 2007

(65) Prior Publication Data

US 2009/0026230 A1    Jan. 29, 2009

(51) Int. Cl.
*F16K 31/06* (2006.01)

(52) U.S. Cl. .............................. 251/129.1; 251/129.16; 251/129.18; 335/267

(58) Field of Classification Search ............. 251/129.1, 251/129.09, 129.16, 129.18, 284, 285; 335/267
See application file for complete search history.

(56) References Cited

U.S. PATENT DOCUMENTS

| 688,086 | A | | 12/1901 | Grossman | |
|---|---|---|---|---|---|
| 2,619,116 | A | | 11/1952 | Ralston | |
| 3,332,045 | A | | 7/1967 | Roadaway | |
| 3,412,971 | A | | 11/1968 | McDivitt | |
| 3,876,177 | A | * | 4/1975 | Putschky | 251/129.18 |
| 4,142,684 | A | | 3/1979 | Schweitzer | |
| 4,544,128 | A | * | 10/1985 | Kolchinsky et al. | 251/129.03 |
| 4,928,028 | A | | 5/1990 | Leibovich | |
| 5,065,979 | A | | 11/1991 | Detweiler et al. | |
| 5,131,624 | A | * | 7/1992 | Kreuter et al. | 251/129.18 |
| 5,169,066 | A | * | 12/1992 | Ricco et al. | 239/585.3 |
| 5,222,714 | A | * | 6/1993 | Morinigo et al. | 251/129.16 |
| 5,223,812 | A | * | 6/1993 | Kreuter | 335/256 |
| 5,299,776 | A | * | 4/1994 | Brinn et al. | 251/129.19 |
| 5,350,153 | A | * | 9/1994 | Morinigo et al. | 251/129.16 |
| 5,560,549 | A | * | 10/1996 | Ricco et al. | 239/533.8 |
| 5,765,513 | A | * | 6/1998 | Diehl et al. | 251/129.18 |
| 5,975,357 | A | | 11/1999 | Topar | |
| 6,003,481 | A | * | 12/1999 | Pischinger et al. | 251/129.16 |
| 6,015,103 | A | | 1/2000 | Kotkowicz | |
| 6,199,587 | B1 | * | 3/2001 | Shlomi et al. | 137/625.5 |

(Continued)

FOREIGN PATENT DOCUMENTS

WO    WO 82/00604    3/1982

(Continued)

*Primary Examiner*—John Bastianelli
(74) *Attorney, Agent, or Firm*—Law Offices of Steven W. Weinrieb (57) ABSTRACT

A hot melt adhesive or other thermoplastic material dispensing valve assembly comprises a pair of oppositely disposed electromagnetic solenoid assemblies which alternatively act upon a pair of armatures which are fixedly mounted upon a valve stem, upon which is fixedly mounted a valve member, so as to rapidly and assuredly control the reciprocal movements of the valve stem, and the valve member attached thereto, between its unseated or OPENED position and its seated or CLOSED position. A coil spring also biases the valve stem and the valve member toward the seated or CLOSED position such that when both of the electromagnetic solenoid assemblies are de-energized, the coil spring maintains the valve member at its seated or CLOSED position upon the valve seat.

20 Claims, 7 Drawing Sheets

U.S. PATENT DOCUMENTS

| | | | |
|---|---|---|---|
| 6,237,550 B1 * | 5/2001 | Hatano et al. | 123/90.11 |
| 6,305,664 B1 * | 10/2001 | Holmes et al. | 251/129.18 |
| 6,315,168 B1 | 11/2001 | Bolyard, Jr. et al. | |
| 6,386,467 B1 * | 5/2002 | Takeda | 251/129.1 |
| 6,581,555 B1 * | 6/2003 | Abele et al. | 251/129.16 |
| 6,732,959 B2 * | 5/2004 | Delaney et al. | 239/585.1 |
| 6,764,061 B2 * | 7/2004 | Haeberer et al. | 251/129.16 |
| 6,814,339 B2 * | 11/2004 | Berger et al. | 251/129.1 |
| 6,820,858 B2 * | 11/2004 | Haeberer et al. | 251/129.16 |
| 6,892,997 B2 * | 5/2005 | Kreuter | 251/129.16 |
| 6,994,234 B2 * | 2/2006 | de Leeuw | 222/504 |
| 2005/0127316 A1 * | 6/2005 | Pauer et al. | 251/129.18 |
| 2005/0230438 A1 * | 10/2005 | Saidman | 222/504 |

FOREIGN PATENT DOCUMENTS

| | | |
|---|---|---|
| WO | WO 00/04754 | 2/2000 |
| WO | WO 02/076615 | 10/2002 |

* cited by examiner

DUAL INLINE SOLENOID-ACTUATED HOT MELT ADHESIVE DISPENSING VALVE ASSEMBLY

FIELD OF THE INVENTION

The present invention relates generally to dispensing valve assemblies, and more particularly to a new and improved dual inline solenoid-actuated hot melt adhesive or other thermoplastic material dispensing valve assembly which is actuated by means of a pair of oppositely disposed inline electromagnetic solenoid assemblies which respectively and alternatively act upon a pair of armatures which are fixedly mounted upon a valve stem, upon which is fixedly attached a valve member, so as to rapidly and assuredly control the reciprocal movements of the valve stem, and the valve member attached thereto, in order to rapidly and assuredly move the valve member between its unseated or OPENED position and its seated or CLOSED position such that the dispensing valve assembly can control the discharge of hot melt adhesive or other thermoplastic material through a hot melt adhesive or other thermoplastic material dispensing nozzle. A coil spring also biases the valve stem and the valve member toward the seated or CLOSED position such that when both of the electromagnetic solenoid assemblies are de-energized, the coil spring maintains the valve member at its seated or CLOSED position upon the valve seat. In addition, the positions of the armatures with respect to the electromagnetic solenoid assemblies can be accurately adjusted, as can the stroke movement of the valve stem and the valve member between the respective seated or CLOSED position and the unseated or OPENED position, so as to effectively optimize the operational cycles of the hot melt adhesive or other thermoplastic dispensing valve assembly.

BACKGROUND OF THE INVENTION

Conventional, hot melt adhesive dispensing valve assemblies are of course well-known in the art. One example of a pneumatically-controlled hot melt adhesive dispensing valve assembly is disclosed within U.S. Pat. No. 6,315,168 which issued to Bolyard, Jr. et al. on Nov. 13, 2001. While this dispensing valve assembly is quite satisfactory from an operational point of view, a special sealing cartridge for the hot melt adhesive and control air fluids is required. In addition, the control valve assembly requires special maintenance procedures to be implemented, and the overall assembly is noisy. Electromagnetic solenoid-controlled dispensing valve assemblies are in fact also known in the art, however, they suffer from several different operational drawbacks. For example, one type of conventional electromagnetic solenoid-controlled dispensing valve assembly comprises the use of a single electromagnetic solenoid assembly for moving the dispensing valve assembly from its seated or CLOSED position to its unseated or OPENED position, while a coil spring mechanism is utilized to move the dispensing valve assembly from its unseated or OPENED position back to its seated or CLOSED position. As can readily be appreciated, however, the use of the coil spring mechanism as the sole means for achieving the return stroke or movement of the dispensing valve assembly from its unseated or OPENED position back to its seated or CLOSED position is problematic for several reasons.

For example, in order to ensure that the movement of the dispensing valve assembly from its unseated or OPENED position back to its seated or CLOSED position is in fact achieved in a relatively quick and responsive manner in order to, in turn, ensure that the discharge or dispensing of the hot melt adhesive material, from the nozzle portion operatively associated with the dispensing valve assembly, is terminated at a substantially precise point in time and without exhibiting stringing of the hot melt adhesive material, the biasing force of the coil spring mechanism must necessarily be significant or substantially large. Conversely, however, if the coil spring mechanism does in fact have a significantly large biasing force oriented in the valve seating or CLOSED direction, then the stroke or movement of the dispensing valve assembly will be relatively slow in that the movement or stroke of the dispensing valve assembly must overcome the significantly large biasing force of the coil spring mechanism. Alternatively, the single electromagnetic solenoid assembly must be fabricated so as to be relatively large in size in order to generate a sufficiently large electromagnetic force which can easily, readily, and quickly overcome the aforenoted substantially large biasing force of the coil spring mechanism in order to ensure the precise and rapid stroke or movement of the valve stem, and the ball valve mounted thereon, when the ball valve is to be moved from its seated or CLOSED position to its unseated or OPENED position.

A need therefore exists in the art for a new and improved solenoid-actuated hot melt adhesive or other thermoplastic material dispensing valve assembly wherein the operational drawbacks characteristic of the conventional, prior art solenoid-actuated hot melt adhesive dispensing valve assemblies can effectively be overcome. More particularly, a need exists in the art for a new and improved solenoid-actuated hot melt adhesive dispensing valve assembly wherein the movements or strokes of the valve stem and the ball valve mounted thereon, from the seated or CLOSED position to the unseated or OPENED position, as well as from the unseated or OPENED position to the seated or CLOSED position, can be assuredly and quickly achieved without the need for a relatively large coil spring mechanism for generating a relatively large valve closure biasing force, and without the need for a relatively large electromagnetic solenoid assembly for generating a relatively large valve opening force for effectively overcoming the relatively large valve closure biasing force of the relatively large coil spring mechanism.

SUMMARY OF THE INVENTION

The foregoing and other objectives are achieved in accordance with the teachings and principles of the present invention through the provision of a new and improved dual inline solenoid-actuated hot melt adhesive or other thermoplastic material dispensing valve assembly which is actuated by means of a pair of oppositely disposed inline electromagnetic solenoid assemblies which respectively and alternatively act upon a pair of armatures which are fixedly mounted upon a valve stem upon which is fixedly attached a valve member. In this manner, the pair of electromagnetic solenoid assemblies can rapidly and assuredly control the reciprocal movements of the valve stem, and the valve member attached thereto, in order to rapidly and assuredly move the valve member between its unseated or OPENED position and its seated or CLOSED position such that the dispensing valve assembly can control the discharge of hot melt adhesive or other thermoplastic material through a hot melt adhesive or other thermoplastic material dispensing nozzle.

A coil spring also biases the valve stem and the valve member toward the seated or CLOSED position such that when both of the electromagnetic solenoid assemblies are de-energized, the coil spring is just sufficiently strong so as to simply maintain the valve member at its seated or CLOSED position upon the valve seat. However, the biasing force of the coil spring mechanism is relatively small since it is not effectively utilized in connection with the movement of the valve stem, and the valve member, from the unseated or OPENED position to the seated or CLOSED position, so as not to adversely affect the movement of the armature and the valve stem when the valve member is to be moved from its seated or CLOSED position to its unseated or OPENED position. In addition, the positions of the armatures with respect to the electromagnetic solenoid assemblies can be accurately adjusted, as can the stroke movement of the valve stem and the valve member between the respective seated or CLOSED position and the unseated or OPENED position, so as to effectively optimize the operational cycles of the hot melt adhesive or other thermoplastic material dispensing valve assembly.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE ILLUSTRATED EMBODIMENTS

Figure 1:
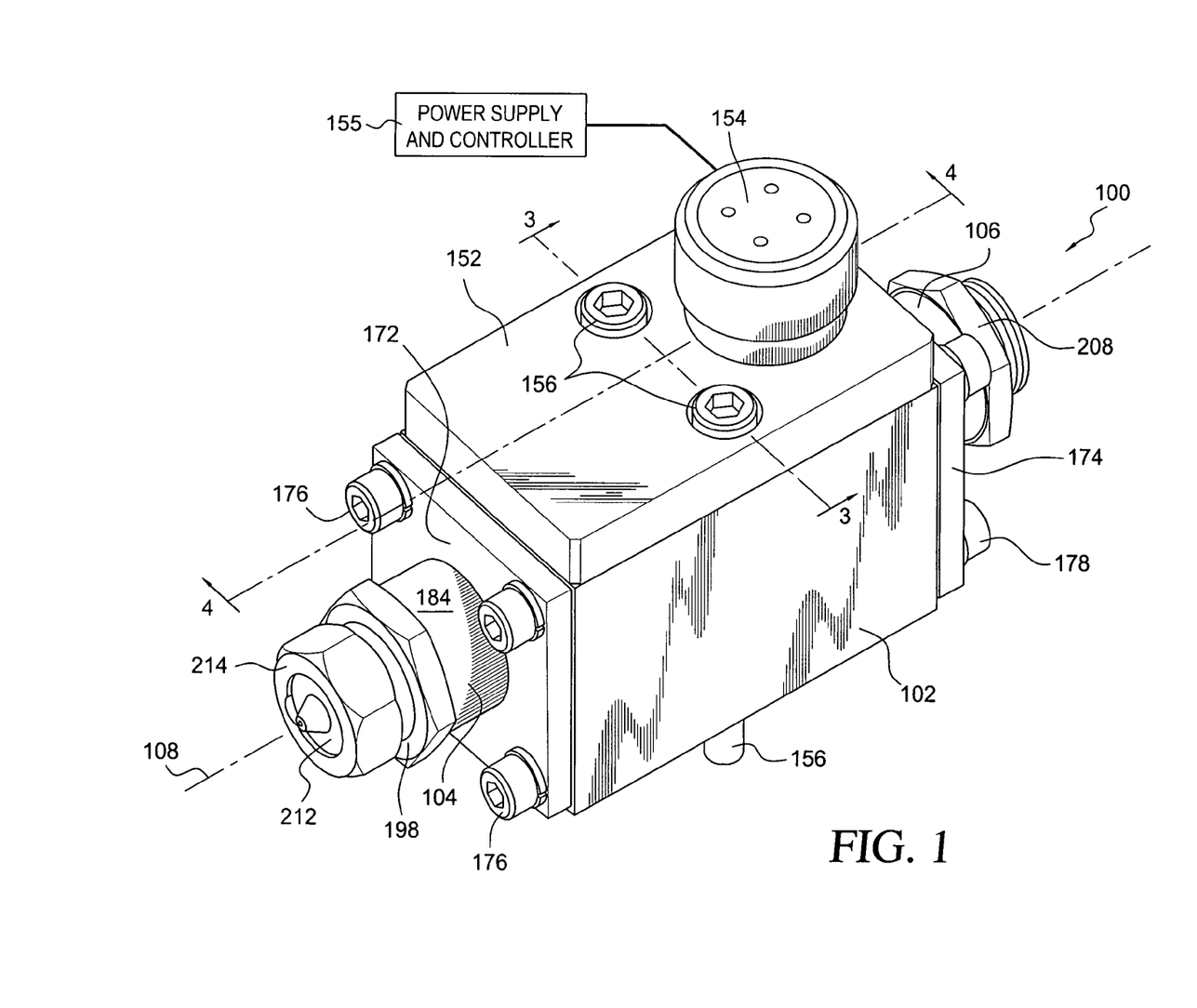
FIG. 1 is a perspective view of a first embodiment of a new and improved dual inline solenoid-actuated hot melt adhesive or other thermoplastic material dispensing valve assembly as constructed in accordance with the principles and teachings of the present invention and showing the same in its assembled state.
Figure 2:
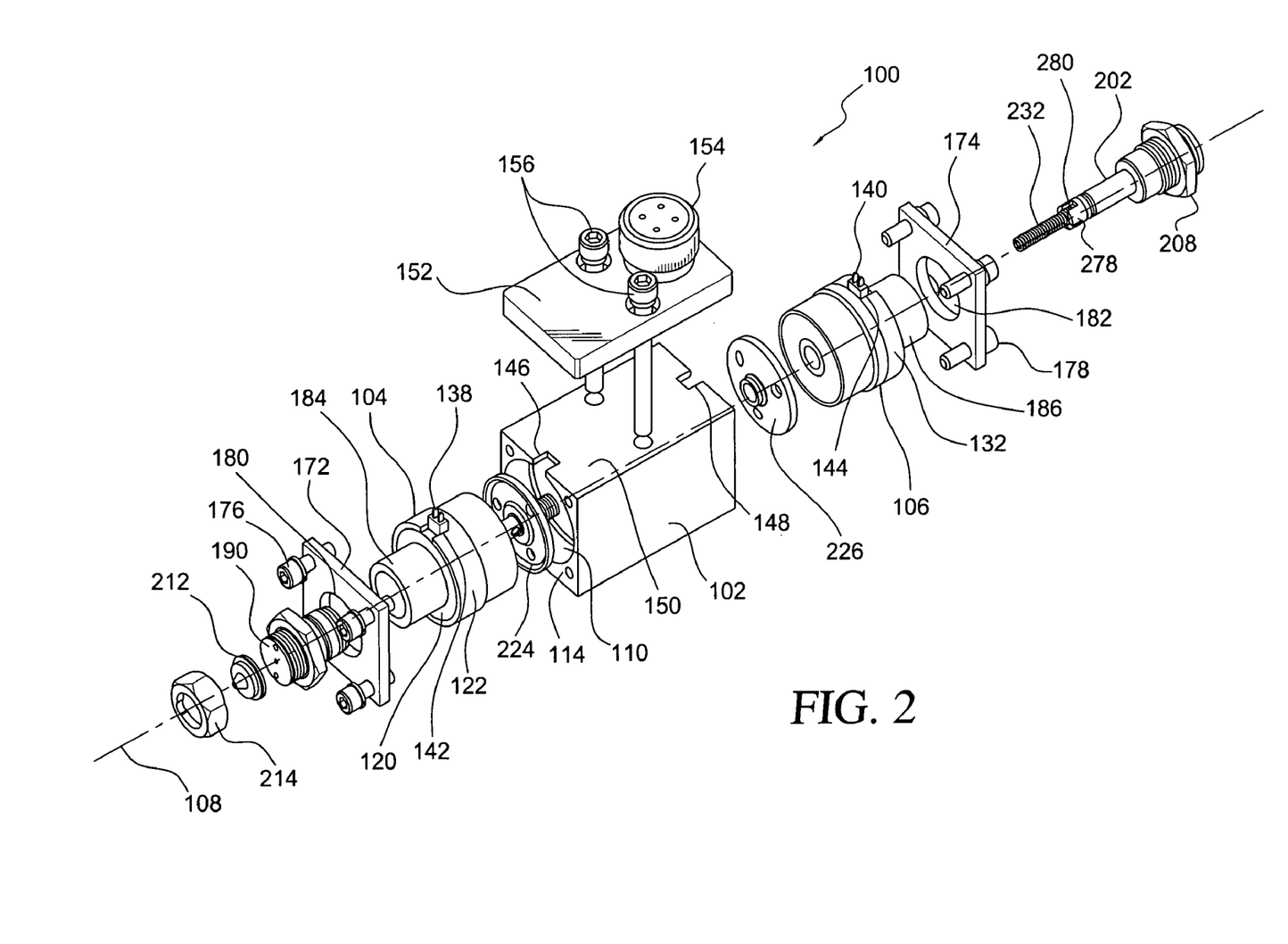
FIG. 2 is an exploded perspective view of the new and improved dual inline solenoid-actuated hot melt adhesive or other thermoplastic material dispensing valve assembly as illustrated within FIG. 1 and showing the variously cooperative component parts thereof.
Figure 4:
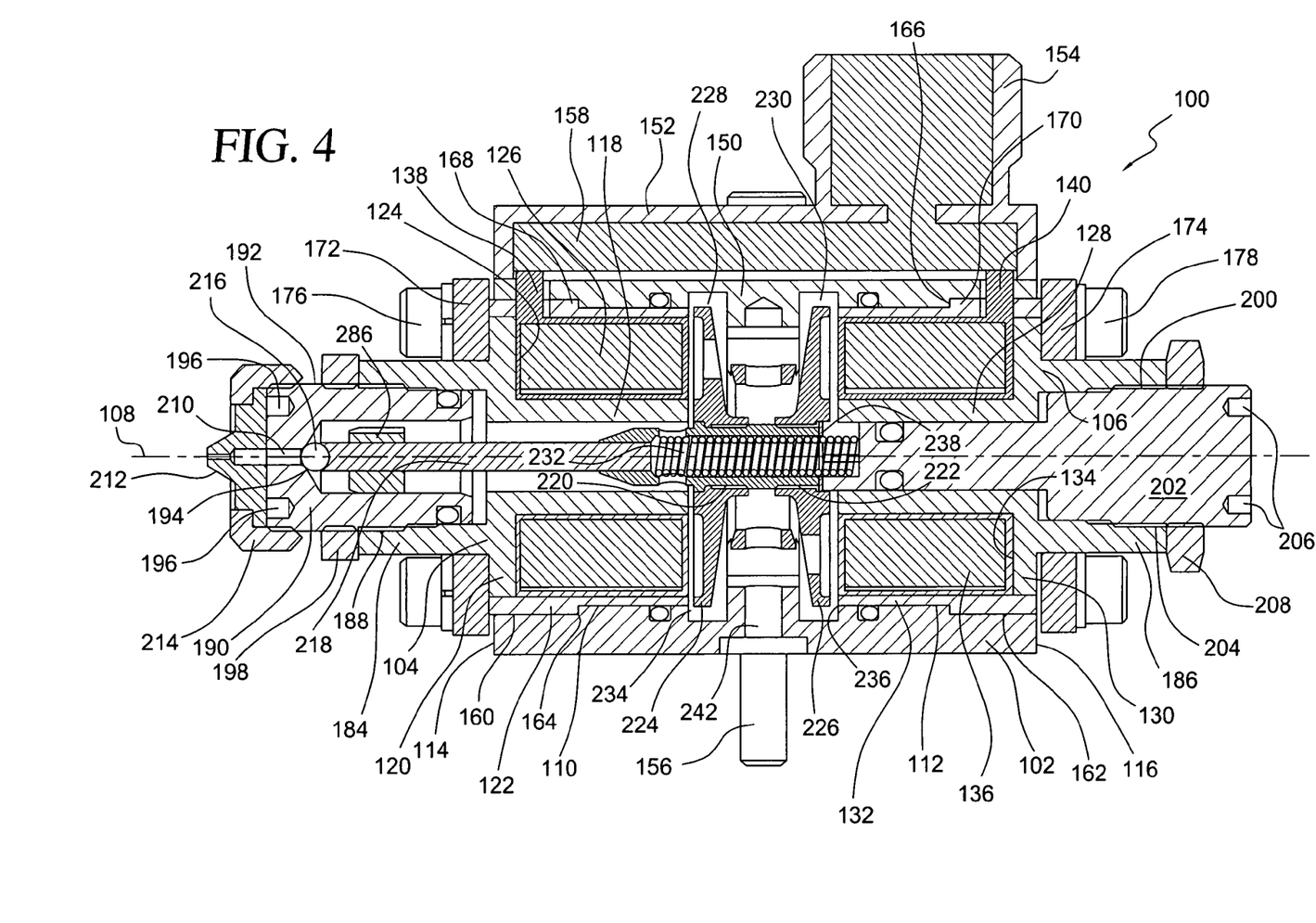
FIG. 4 is a cross-sectional view of the new and improved dual inline solenoid-actuated hot melt adhesive or other thermoplastic material dispensing valve assembly as illustrated within FIG. 1 and as taken along lines 4-4 of FIG. 1, wherein the dispensing valve is illustrated at its seated or CLOSED position.

Referring now to the drawings, and more particularly initially to FIGS. 1,2, and 4 thereof, a new and improved dual inline solenoid-actuated hot melt adhesive or other thermoplastic material dispensing valve assembly, as has been constructed in accordance with the principles and teachings of the present invention, is disclosed and is generally indicated by the reference character 100. More particularly, it is seen that the new and improved dual in-line solenoid-actuated hot melt adhesive or other thermoplastic material dispensing valve assembly 100 comprises a housing 102 within which a pair of oppositely disposed electromagnetic solenoid assemblies 104,106 are adapted to be mounted so as to effectively be annularly disposed around the longitudinal axis 108 of the dual inline solenoid-actuated hot melt adhesive or other thermoplastic material dispensing valve assembly 100. As can best be appreciated from FIGS. 2 and 4, the housing 102 is provided with a pair of oppositely disposed stepped bores 110,112 which extend axially inwardly into the housing 102 from a pair of oppositely disposed external end faces or wall members 114,116, and it is to be appreciated that substantial portions of the electromagnetic solenoid assemblies 104,106 are adapted to be disposed within the aforenoted stepped bores 110,112 defined within the housing 102. As can best be appreciated from FIG. 4, each one of the electromagnetic solenoid assemblies 104,106 effectively comprises a three-piece structure, although it is possible that each one of the electromagnetic solenoid assemblies 104,106 could also effectively comprise a two-piece structure, as will be discussed shortly hereinafter.

More particularly, it is seen, for example, that the electromagnetic solenoid assembly 104 comprises a radially inner, axially extending annular or tubular core portion 118, a radially outwardly extending, annular flange portion 120 integrally connected to the radially inner, axially extending annular core portion 118, and a radially outer annular cover member 122 disposed around and effectively covering both the radially inner, axially extending annular core portion 118 and the radially outwardly extending, annular flange portion 120 so as to define with the radially inner, axially extending annular core portion 118 and the radially outwardly extending, annular flange portion 120 an annular pocket 124, which is open upon one end portion thereof, within which is disposed an annular electromagnetic coil 126. In a similar manner, the electromagnetic solenoid assembly 106 comprises a radially inner, axially extending annular core portion 128, a radially outwardly extending, annular flange portion 130 integrally connected to the radially inner, axially extending annular core portion 128, and a radially outer annular cover member 132 disposed around and effectively covering both the radially inner, axially extending annular or tubular core portion 128 and the radially outwardly extending, annular flange portion 130 so as to define with the radially inner, axially extending annular core portion 128 and the radially outwardly extending, annular flange portion 130 an annular pocket 134, which is open upon one end portion thereof, within which is disposed an annular electromagnetic coil 136. The electromagnetic coils 126,136 are potted within the annular pockets 124,134 so as to effectively seal the same against the ingress of any hot melt adhesive material, and it is seen that the free end portions or terminal members 138,140 of the electromagnetic coils 126,136 extend radially through first slots 142,144 respectively defined within the annular cover members 122, 132 and through second slots 146,148 respectively defined within upper wall member 150 of the valve assembly housing 102.

Alternatively, the free end portions or terminal members 138,140 of the electromagnetic coils 126,136 can initially be routed axially and then radially. A cover member 152, having an upstanding electrical connector 154 integrally formed therewith and adapted to be electrically connected to a power supply and controller 155, is adapted to not only be fixedly secured atop the housing by means of a pair of bolt fasteners 156, but in addition, the bolt fasteners 156 secure the entire hot melt adhesive or other thermoplastic material dispensing valve assembly 100 atop a hot melt adhesive or other thermoplastic material supply unit, not shown, from which hot melt adhesive or other thermoplastic material is supplied into the hot melt adhesive or other thermoplastic dispensing valve assembly 100 as will be more fully disclosed hereinafter. It is further seen that the cover member 152 has an internal conduit 158 defined therein within which electrical wiring, interconnecting the pair of free end portions or terminal members 138,140 of the electromagnetic coils 126,136 to the electrical connector 154, can be routed. As has been noted, in lieu of the core portions 118,128 being separate structural pieces with respect to the annular cover members 122,132 wherein the core portions 118,128 would, for example, be press-fitted or otherwise bonded to the annular cover members 122,132, the core portions 118,128 and the annular cover members 122, 132 could respectively be fabricated as single integral components.

Continuing further, and in connection with the actual installation of the electromagnetic solenoid assemblies 104, 106 within the stepped bores 110,112 of the housing 102, it is seen that the stepped bores 110,112 are respectively provided with annular counterbored regions 160,162 which extend axially inwardly into the housing 102 from the pair of oppositely disposed external end faces or wall members 114, 116 so as to define radially extending annular ridge portions 164, 166, and in a corresponding manner, the annular cover members 122,132 also have stepped configurations so as to respectively define annular shoulder portions 168,170 which are adapted to engage the aforenoted annular ridge portions 164, 166 of the housing counterbored regions 160,162. In this manner, as can best be appreciated from FIG. 4, when the electromagnetic solenoid assemblies 104,106 are inserted within the hot melt adhesive dispensing valve assembly housing 102, they will be precisely located or positioned within the housing 102. Still yet further, in order to fixedly retain the electromagnetic solenoid assemblies 104,106 within the bores 110,112 of the housing 102, a pair of end plates 172,174 are adapted to engage the radially outwardly extending flanged portions 120,130 of the electromagnetic solenoid assemblies 104,106, the end plates 172,174 being fixed onto the end faces or wall members 114,116 of the housing 102 by means of a plurality of bolt fasteners 176,178. In addition, it is also seen that each one of the end plates 172,174 has a central aperture 180,182 defined therein in order to permit axially outwardly extending tubular or annular portions 184, 186 of the electromagnetic solenoid assemblies 104,106 to respectively project therethrough as can best be seen or appreciated from FIGS. 2 and 4. Alternatively, end plate 172, radially outwardly extending flanged portion 120, and annular cover member 122 may comprise an integrated or single-piece structure, and similarly for end plate 174, radially outwardly extending flanged portion 130, and annular cover member 132.

More particularly, it is seen that the free or distal annular end section of the annular portion 184 of the electromagnetic solenoid assembly 104 is internally threaded as at 188, and a tubular or annular valve seat member 190 is externally threaded as at 192. The valve seat member 190 comprises a valve seat 194, and bores 196 are provided within the external end face of the valve seat member 190 for receiving, for example, a spanner wrench or similar rotating tool so as to effectively adjust the axial position of the valve seat member 190 within the annular portion 184 of the electromagnetic solenoid assembly 104. In addition, a locknut 198 is also threadedly engaged upon the externally threaded portion 192 of the valve seat member 190 and is adapted to engage the external annular end face of the annular portion 184 of the electromagnetic solenoid assembly 104 so as to fixedly lock the valve seat member 190 at a particular axially adjusted position with respect to the electromagnetic solenoid assembly 104. In a similar manner, it is seen that the free or distal annular end section of the annular portion 186 is internally threaded as at 200, and a valve stroke-adjustment stop member 202 is externally threaded as at 204. Bores 206 are provided within the external end face of the valve stroke-adjustment stop member 202 for receiving, for example, a spanner wrench or similar rotating tool so as to effectively adjust the axial position of the valve stroke-adjustment stop member 202 within the annular portion 186 of the electromagnetic solenoid assembly 106 and a locknut 208 is also threadedly engaged upon the externally threaded portion 204 of the valve stroke-adjustment stop member 202 so as to engage the external annular end face of the annular portion 186 of the electromagnetic solenoid assembly 106 and thereby fixedly lock the valve stroke-adjustment stop member 202 at a particular axially adjusted position with respect to the electromagnetic solenoid assembly 106.

Continuing further, the valve seat member 190 is provided with an axially extending bore 210, and a dispensing nozzle 212 is adapted to be fixedly mounted upon the valve seat member 190 by means of an internally threaded locknut 214 which is threadedly engaged upon the externally threaded portion 192 of the valve seat member 190. Alternatively, the dispensing nozzle 212 and the valve seat member 190 can comprise a one-piece integral structure whereby the locknut 214 can effectively be eliminated. A ball valve 216 is integrally mounted upon a forward or downstream end portion of a valve stem 218, and it is seen that the valve stem 218 extends axially within the valve seat member 190 and the annular or tubular portion 118 of the electromagnetic solenoid assembly 104. It is also seen that the rearward or upstream end portion of the valve stem 218 is externally threaded, and a pair of radially outwardly extending annular armatures 224,226, respectively disposed within a pair of radially oriented annular chambers 228,230 defined within housing 102, are internally threaded so as to be threadedly engaged upon the upstream or rearward end portion of the valve stem 218 as at 220,222. Other means can of course be implemented for fixedly securing the armatures 224,226 upon the valve stem 218, such as, for example, by press-fitting or the like. Still further, it is also seen that the rearward or upstream end portion of the valve stem 218 is tubular, as is the forward end portion of the valve stroke-adjustment stop member 202, and in this manner, a coil spring 232 is able to be accommodated within both structures or components. It is to be noted that in lieu of the axially separated annular armatures 224, 226 disposed up-on the valve stem 218, a single annular armature, having, for example, a substantially H-shaped cross-sectional configuration, could be utilized and fixedly secured upon the valve stem 218, or alternatively still further, the armatures 224, 226 may comprise separate components but need not necessarily be axially spaced upon the valve stem 218.

While a complete cyclical operation of the new and improved dual inline solenoid-actuated hot melt adhesive or other thermoplastic dispensing valve assembly 100 will be described hereinafter, it is to be appreciated at this point in time that when the electromagnetic coil 126 of the electromagnetic solenoid assembly 104 is energized, the armature 224 will be magnetically attracted toward the electromagnetic coil 126 so as to effectively move the valve stem 218 toward the left as viewed in FIG. 4 whereby the ball valve 216 will be seated upon the valve seat 194. Alternatively, when the electromagnetic coil 136 of the electromagnetic solenoid assembly 106 is energized, the armature 226 will be magnetically attracted toward the electromagnetic coil 136 so as to effectively move the valve stem 218 toward the right as viewed in FIG. 4, against the biasing force of coil spring 232 which will be compressed between the valve stem 218 and the valve stroke-adjustment stop member 202, whereby the ball valve 216 will be unseated from the valve seat 194. Subsequently, when the electromagnetic coil 136 of the electromagnetic solenoid assembly 106 is de-energized, and the electromagnetic coil 126 of the electromagnetic solenoid assembly 104 is re-energized, the ball valve 216 will again be seated upon the valve seat 194, and still further, upon de-energization of the electromagnetic coil 126 of the electromagnetic solenoid assembly 104, the coil spring 232 is sufficiently strong so as to maintain the ball valve 216 seated upon the valve seat 194. It can therefore be appreciated that while the electromagnetic coils 126,136 are utilized so as ensure quick and rapid stroke movements of the valve stem 218 and the ball valve 216 with respect to the seated or CLOSED position and the unseated or OPEN position, the electromagnetic coil 126 need not be energized to maintain the ball valve 216 at its seated or CLOSED position. It is to be noted that the aforenoted energization, de-energization, and re-energization operative cycles for the electromagnetic solenoid assemblies 104,106 are of course controlled by means of the aforenoted power supply and controller 155.

Figure 5:
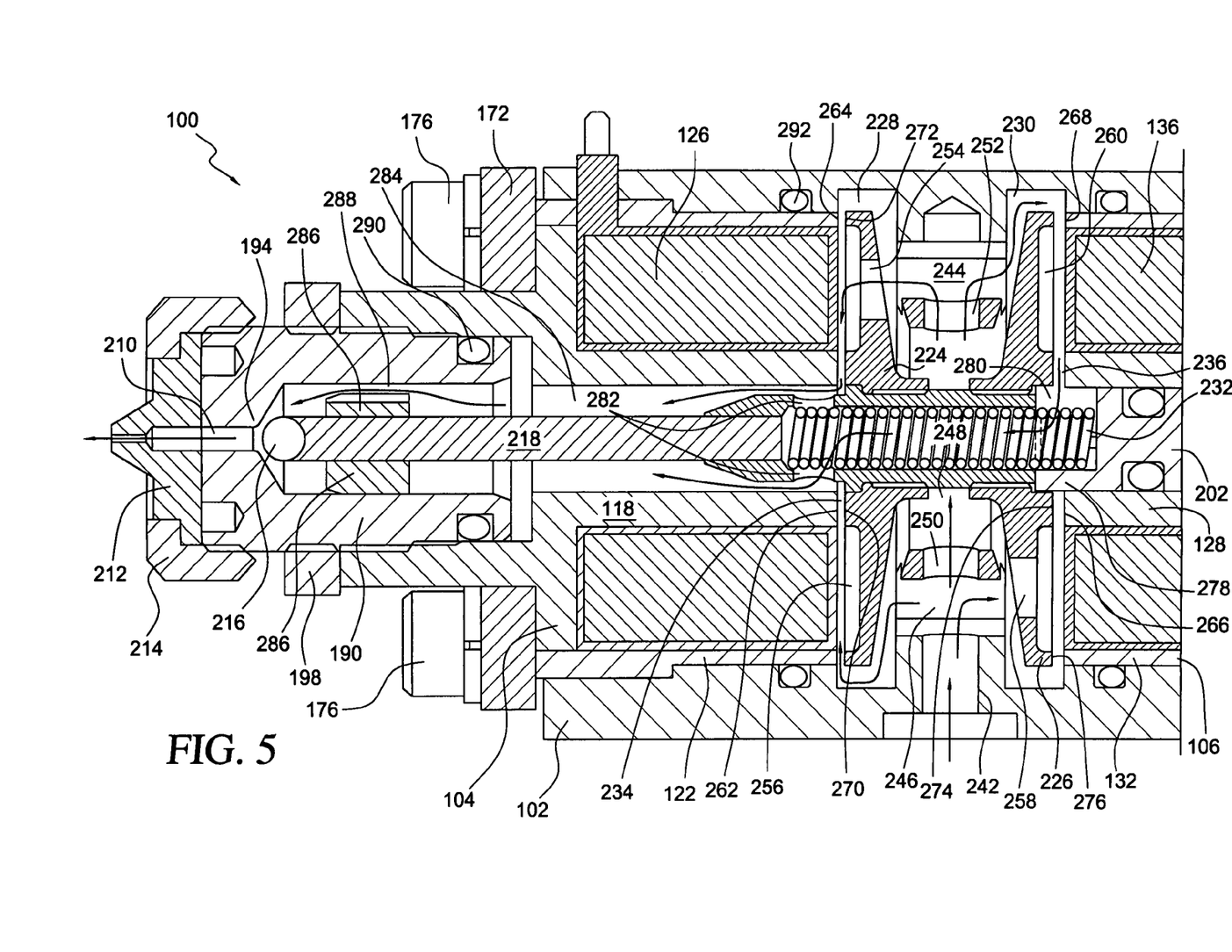
FIG. 5 is an enlarged partial cross-sectional view, similar to that of FIG. 4, wherein, however, the cover member has been removed and the dispensing valve is illustrated at its unseated or OPENED position so as to illustrate the flow of the hot melt adhesive or other thermoplastic material internally within the dispensing valve assembly from the inlet port to the dispensing nozzle.
Figure 6:
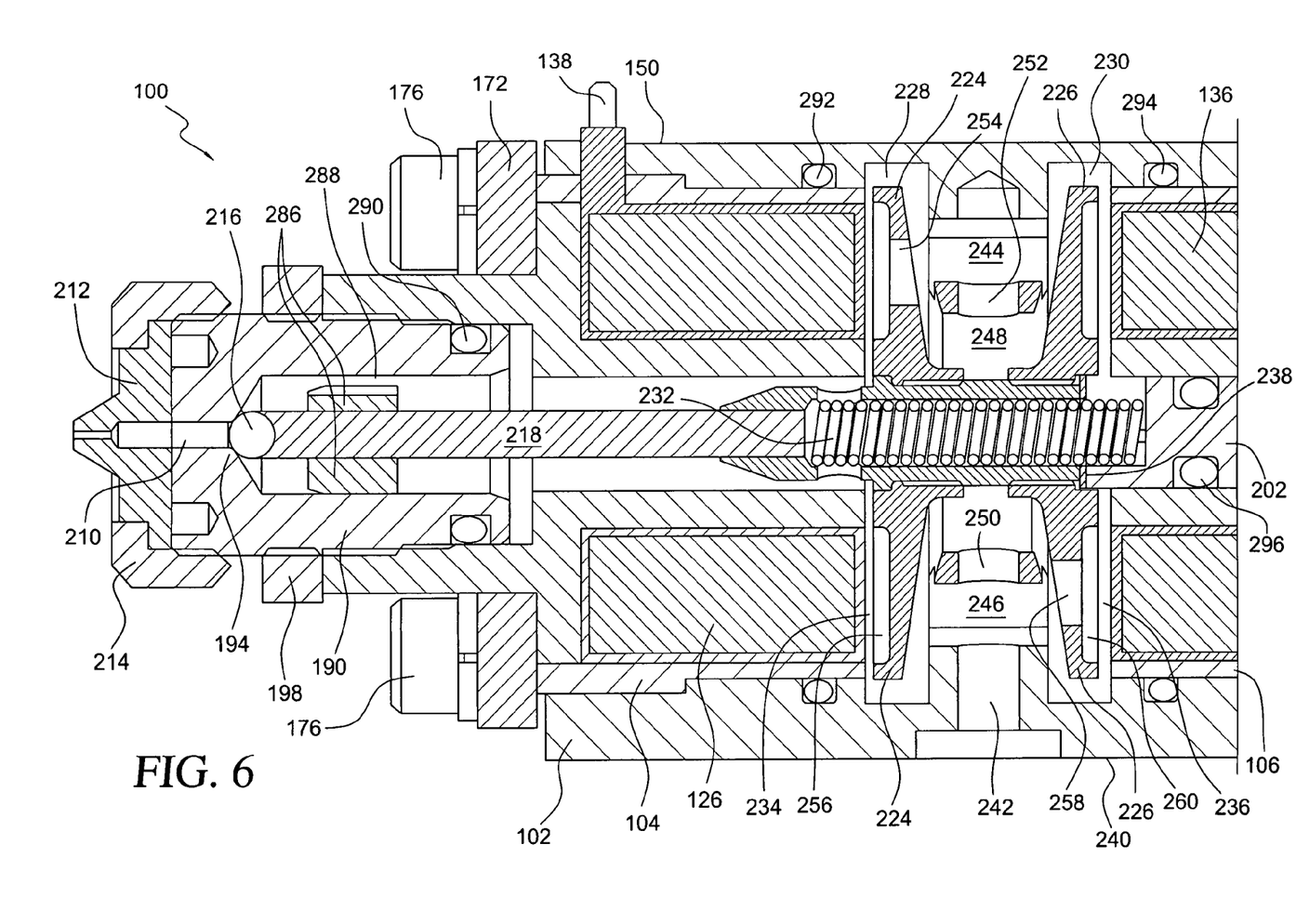
FIG. 6 is an enlarged partial cross-sectional view similar to that of FIG. 5, wherein, however, the dispensing valve is again illustrated at its SEATED or CLOSED position.

With reference still being made to FIG. 4, and with additional reference being made to FIGS. 5 and 6, it is to be appreciated that when the new and improved dual inline solenoid-actuated hot melt adhesive dispensing valve assembly 100 is initially assembled, as illustrated within FIGS. 4 and 6, first and second predetermined gaps or spaces 234,236 are respectively defined between the right end face portion of the electromagnetic solenoid assembly 104 and the armature 224, and between the left end face portion of the electromagnetic solenoid assembly 106 and the armature 226, while a third predetermined gap or space 238 is defined between the rearward or upstream end portion of the valve stem 218 and the forward end portion of the valve stroke-adjustment stop member 202. More particularly, the first and second predetermined gaps or spaces 234,236 can be within the range of, for example, 0.008-0.030 inches (0.008-0.030"), while the third predetermined gap or space 238 can be within the range of, for example, 0.008-0.015 inches (0.008-0.015").

However, when the ball valve 216 is in fact seated upon the valve seat 194 as illustrated within FIGS. 4 and 6, it is preferred, for example, that the first predetermined gap 234 will be approximately 0.009 inches (0.009"), the second predetermined gap 236 will be approximately 0.017 inches (0.017"), and the third predetermined gap 238, which effectively defines the movement stroke of the valve stem 218 and the ball valve 216 with respect to the valve seat 194, will be approximately 0.008 inches (0.008"). When the electromagnetic coil 136 of the electromagnetic solenoid assembly 106 is energized so as to effectively magnetically attract the armature 226 thereto and thereby unseat the ball valve 216 from its seated or CLOSED position to its unseated or OPEN position as illustrated within FIG. 5, the first predetermined gap or space 234 will be now be approximately 0.017 inches (0.017"), the second predetermined gap or space 236 will now be approximately 0.009 inches (0.009"), and the third predetermined gap or space 238 will now be zero as a result of the right end face portion of the valve stem 218 being disposed in contact with, and abutting, the left end face portion of the valve stroke-adjustment stop member 202.

The aforenoted predetermined gaps or spaces 234, 236,238 may in fact be precisely defined in view of the fact that various parameters are known. For example, since the precise location of the electromagnetic solenoid assembly 104 within the housing 102 is known, and knowing the fact that the left armature 224 is threadedly located at a precise position upon the rearward or upstream end portion of the valve stem 218, and knowing, still further, the thread pitch of the threads defined between the internally threaded portion 188 of the annular portion 184 of the electromagnetic solenoid assembly 104, and the externally threaded portion 192 of the annular valve seat member 190, the axial location of the annular valve seat member 190 within the electromagnetic solenoid assembly 104 can be precisely adjusted. Accordingly, the disposition of the ball valve 216, seated upon the valve seat 194, and the disposition of the valve stem 218, having the armature 224 fixedly disposed thereon, will be predetermined so as to in fact predetermine the first gap or space 234. In a similar manner, since the right armature 226 is then threadedly located at a precise position upon the rearward or upstream end portion of the valve stem 218, and since the location of the electromagnetic solenoid assembly 106 within the housing 102 is known, predetermined, or precisely located, the second gap or space 236 is likewise precisely predetermined. Still further, since the thread pitch defined between the internally threaded portion 200 of the annular end section of the annular portion 186 of the electromagnetic solenoid assembly 106 and the externally threaded portion 204 of the valve stroke-adjustment stop member 202 is also known, the axial location of the valve stroke-adjustment stop member 202 within the electromagnetic solenoid assembly 106 can be precisely adjusted so as to define the third space or gap 238, and thereby the movement stroke of the valve stem 218 and the ball valve 216 between their seated or CLOSED positions and their unseated or OPENED positions.

Figure 3:
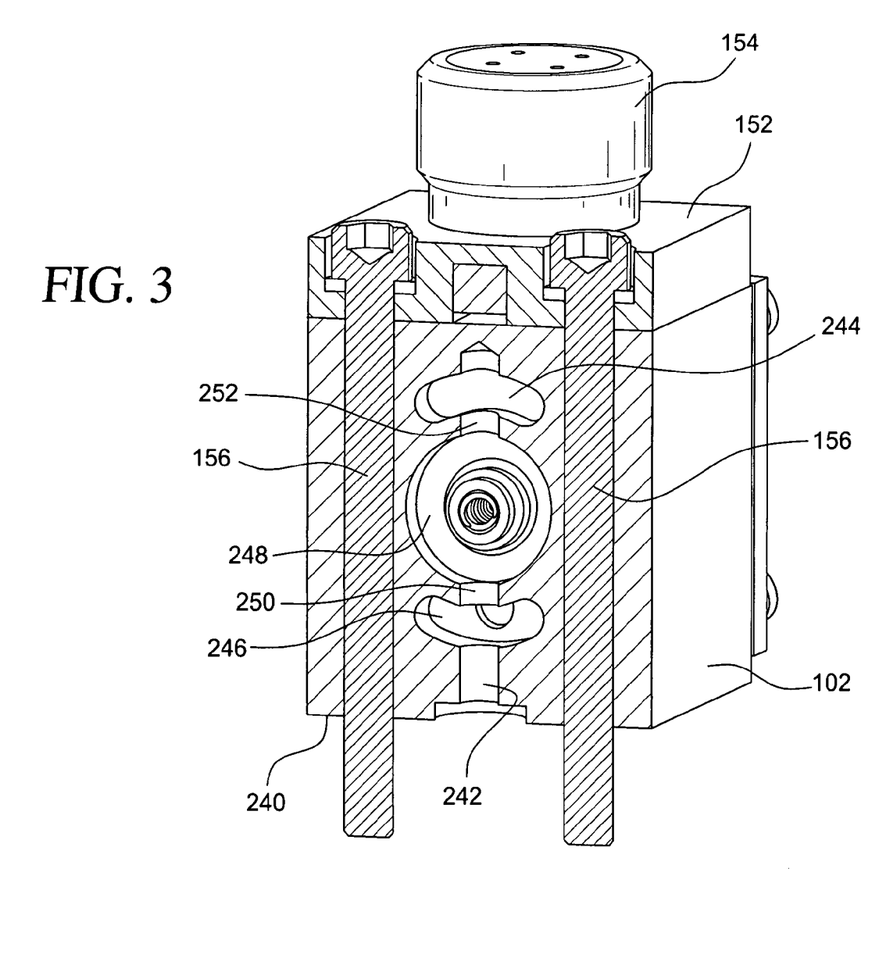
FIG. 3 is a cross-sectional view of the new and improved dual inline solenoid-actuated hot melt adhesive or other thermoplastic material dispensing valve assembly as illustrated within FIG. 1 and as taken along lines 3-3 of FIG. 1.

With reference now being made to FIGS. 3,5, and 6, it will be recalled that the hot melt adhesive dispensing valve assembly 100 is adapted to be fixedly secured atop a hot melt adhesive or other thermoplastic material supply unit, not shown, by means of the bolt fasteners 156 such that a supply of the hot melt adhesive or other thermoplastic material can be supplied into the hot melt adhesive or other thermoplastic material dispensing valve assembly 100. Accordingly, it is seen that the bottom wall member 240 is provided with a substantially centrally located hot melt adhesive or other thermoplastic material inlet supply port or passageway 242 which extends vertically upwardly into the housing 102, and first and second, upper and lower arcuately configured passageways 244,246 are defined within the housing 102 so as to be respectively interposed between the upper wall member 150 of the housing 102 and the rearward or upstream end portion of the valve stem 218, and between the lower wall member 240 of the housing 102 and the rearward or upstream end portion of the valve stem 218. In addition, it is also seen that the upper and lower arcuately configured passageways 244, 246 have predetermined axial extents so as to fluidically interconnect the fluid chambers 228,230 within which the armatures 224,226 are disposed, and still further, an annular passageway 248 is defined within the housing 102 so as to be annularly disposed around the rearward or upstream end portion of the valve stem 218.

Auxiliary fluid passageways 250,252, which are effectively inward extensions of the inlet supply port or passageway 242, are also provided within the housing 102 so as to respectively fluidically interconnect the lower arcuate passageway 246 to the annular passageway 248, and the annular passageway 248 to the upper arcuate passageway 244. Still yet further, it is seen that the armature 224 is provided with a plurality of circumferentially spaced, axially oriented bores 254, and an annular cup-shaped or recessed portion 256 which is defined within the face of the armature 224 which is disposed toward electromagnetic solenoid assembly 104 such that the annular portion 256 of the armature 224 is effectively radially aligned with the electromagnetic coil 126. In a similar manner, the armature 226 is provided with a plurality of circumferentially spaced, axially oriented bores 258, and an annular cup-shaped or recessed portion 260 which is defined within the face of the armature 226 which is disposed toward electromagnetic solenoid assembly 106 such that the annular portion 260 of the armature 224 is effectively radially aligned with the electromagnetic coil 136. In this manner, it can be appreciated that as a result of the provision of the various fluid passageways 242-250, as well as the bores 254, 258 and the recessed portions 256,260 of the armatures 224, 226, the incoming or supplied hot melt adhesive or other thermoplastic material can quickly flow to all parts of the chambers 228,230 so as to completely fill the same whereby the armatures 224,226, respectively disposed within the chambers 228,230, will be completely immersed within the hot melt adhesive or other thermoplastic material.

Continuing still further, and with reference still being made to FIGS. 5 and 6, it is also seen that as a result of the aforenoted structure comprising each one of the electromagnetic solenoid assemblies 104,106, each one of the electromagnetic armatures 224,226, and the relative disposition of the armatures 224,226 with respect to the electromagnetic solenoid assemblies 104,106, the electromagnetic interaction defined between the electromagnetic solenoid assemblies 104,106 and the armatures 224,226 can readily be appreciated or understood. More particularly, it is seen that the radially inner, axially extending annular or tubular core portion 118 of the electromagnetic solenoid assembly 104 comprises a radially inner annular end face 262, and that the radially outer annular cover member 122 of the electromagnetic solenoid assembly 104 comprises a radially outer annular end face 264. In a similar manner, the radially inner, axially extending annular or tubular core portion 128 of the electromagnetic solenoid assembly 106 comprises a radially inner annular end face 266, and that the radially outer annular cover member 132 of the electromagnetic solenoid assembly 106 comprises a radially outer annular end face 268. Correspondingly, it is seen that the radially inner annular portion of the armature 224 comprises a radially inner annular end face 270, and that the radially outer annular portion of the armature 224 comprises a radially outer annular end face 272. In a similar manner, the radially inner annular portion of the armature 226 comprises a radially inner annular end face 274, and that the radially outer annular portion of the armature 226 comprises a radially outer annular end face 276.

It is also to be noted that while the radial thicknesses of the radially inner, axially extending annular or tubular core portions 118,128 of the electromagnetic solenoid assemblies 104,106 and those of their annular end face 262, 266 are greater than the radial thicknesses of the radially outer annular cover member 122,132 of the electromagnetic solenoid assemblies 104,106 and those of their annular end faces 264, 268, the radial thickness dimensions of the radially inner, axially extending annular or tubular core portions 118,128 and of the radially outer annular cover members 122, 132 of the electromagnetic solenoid assemblies 104,106 are predeterminedly selected such that the surface areas of the radially outer annular end faces 264,268 of the radially outer annular cover members 122,132 are substantially equal to the surface areas of the radially inner annular end faces 262,266 of the radially inner, axially extending annular or tubular core portions 118,128. This is because of the greater radial distances of the radially outer annular end faces 264, 268 of the radially outer annular cover members 122,132 with respect to the radial distances of the radially inner annular end faces 262, 266 of the radially inner, axially extending annular or tubular core portions 118,128 as measured from the longitudinal axis 108 of the hot melt adhesive dispensing valve assembly 100, it being remembered that the surface area of a circular geometrical figure is directly proportional to the radius squared.

Similar surface area characteristics are likewise applicable to, or true of, the radially inner annular end face 270 of the radially inner annular portion of the armature 224 with respect to the radially outer annular end face 272 of the radially outer annular portion of the armature 224, and similarly with respect to the radially inner annular end face 274 of the radially inner annular portion of the armature 226 with respect to the radially outer annular end face 276 of the radially outer annular portion of the armature 226. In addition, the radial thicknesses and surface areas of the radially inner annular end faces 262,266 of the radially inner, axially extending annular or tubular core portions 118,128 are respectively substantially equal to the radial thicknesses and surface areas of the radially inner annular end faces 270,274 of the radially inner annular portions of the armatures 224, 226, and similarly, the radial thicknesses and surface areas of the radially outer annular end faces 264,268 of the radially outer annular cover members 122,132 are respectively substantially equal to the radial thicknesses and surface areas of the radially outer annular end faces 272,276 of the radially outer annular portions of the armatures 224,226. Still yet further, it is also noted that the armatures 224,226 comprise radially outward tapered structures such that the axial thicknesses of the armatures 224,226 progressively decrease as one proceeds in the radially outward direction. In this manner, the flux density characteristics of the armatures 224,226 are substantially constant throughout their structures.

Having described substantially all of the pertinent structure characteristic of the new and improved dual inline solenoid-actuated hot melt adhesive or other thermoplastic material dispensing valve assembly 100, the operation of the new and improved dual inline solenoid-actuated hot melt adhesive or other thermoplastic material dispensing valve assembly 100 will now be described. With reference therefore being made to FIGS. 5 and 6, it is seen that prior to the initiation of a hot melt adhesive or other thermoplastic material dispensing cycle, the various components parts of the new and improved dual inline solenoid-actuated hot melt adhesive or other thermoplastic material dispensing valve assembly 100 are at their respective positions illustrated within FIG. 6, that is, for example, both of the electromagnetic coils 126,136 of the electromagnetic solenoid assemblies 104,106 have been de-energized and the ball valve 216 is seated upon its valve seat 194 under the biasing force of the coil spring 232.

When it is desired to initiate a hot melt adhesive or other thermoplastic material dispensing cycle, electromagnetic coil 136 of electromagnetic solenoid assembly 106 will be energized, and accordingly, as a result of the magnetic attraction of the armature 226 to the electromagnetic solenoid assembly 106, as developed by means of the magnetic flux flowing, for example, through the axially extending annular or tubular core portion 128 of the electromagnetic solenoid assembly 106, through gap 236, through armature 226, back through gap 236, through radially outer annular cover member 132, and through radially outwardly extending, annular flange portion 130, armature 226 will be moved toward the right, as viewed within FIGS. 5 and 6, whereby the valve stem 218 will likewise be moved toward the right, against the biasing force of coil spring 232, until the upstream or rearward end portion of the valve stem 218 encounters the forward end portion of the valve stroke-adjustment stop member 202. As a result of the rightward movement of the valve stem 218, the ball valve 216, mounted upon valve stem 218, will be moved to its unseated or OPENED position with respect to its valve seat 194 whereby hot melt adhesive or other thermoplastic material can be discharged and dispensed from dispensing nozzle 212, such a dispensing operation or cycle of the hot melt adhesive or other thermoplastic material from dispensing nozzle 212 continuing as long as the electromagnetic coil 136 of the electromagnetic solenoid assembly 106 is maintained in its energized state.

More particularly, as can best be appreciated from FIG. 5, when in fact the ball valve 216 has been moved to its unseated or OPENED position with respect to the valve seat 194, as has been previously noted, hot melt adhesive or other thermoplastic material, being supplied into the new and improved dual inline solenoid-actuated hot melt adhesive or other thermoplastic material dispensing valve assembly 100 through means of inlet port or passageway 242, will flow into lower passageway 246 and from there will essentially be split into three fluid flows. The first fluid flow will enter the lower end portion of the chamber 228, flow around the lower end portion of the armature 224, and enter the lower end portion of the gap 234. The second fluid flow will continue upwardly through fluid passageways 250,248,252,244 and will, in turn, be split so as to not only enter the upper end portion of the chamber 228 so as to flow around the upper end portion of the armature 224, as well as to flow through the bores 254 defined within the armature 224 so as to enter the upper end portion of the gap 234, but, in addition, will also flow into the upper end portion of the chamber 230. The third fluid flow will enter the lower end portion of the chamber 230 so as to not only flow around the lower end portion of the armature 226, but, in addition, will flow the bores 258 defined within the armature 226 so as to enter the cup-shaped recessed portion 260 of the armature 226 as well as the lower end portion of the gap 236. It is additionally seen that the forward end portion of the valve stroke-adjustment stop member 202 has a split configuration, as can best be seen from FIG. 2, whereby a plurality of circumferentially spaced, axially extending projections 278, which effectively form a recessed chamber within which the rear end portion of the coil spring 232 is seated, also define circumferentially spaced slots 280 therebetween.

In addition, it is also seen the portion of the valve stem 218, within which the forward end portion of the coil spring 232 is seated, is provided with a plurality of circumferentially spaced apertures 282. Accordingly, it can be appreciated further that the hot melt adhesive or other thermoplastic material, disposed within gap 236, can enter slots 280, defined within the forward end portion of the valve stroke-adjustment stop member 202, so as to, in turn, enter the interior portion of the coil spring 232 from which it can then exit, through means of apertures 282, so as to enter the annular space 284 defined between the radially inner core portion 118 of the electromagnetic solenoid assembly 104 and the valve stem 218. In a similar manner, hot melt adhesive or other thermoplastic material, disposed within gap 234, will also enter the annular space 284 whereby the combined fluid flows will proceed toward the dispensing nozzle 212. It is lastly noted that the forward end portion of the valve stem 218 is provided with a spider-type structure whereby a plurality of circumferentially spaced leg members 286 of such spider structure effectively support the forward end portion of the valve stem 218 within the valve seat member 190 as well as guide the same during the reciprocal stroke movements of the valve stem 218 with respect to the valve seat member 190.

Spaces 288, defined between the leg members 286 and within the internal chamber of the valve seat member 190 in which the forward end portion of the valve stem 218 is disposed, permit the aforenoted combined fluid flow of the hot melt adhesive or other thermoplastic material to flow past the same and into the axially extending discharge bore 210 of the valve seat member 190. It is to be noted that the provision of the various aforenoted split fluid flows throughout the structure of the new and improved dual inline solenoid-actuated hot melt adhesive or other thermoplastic material dispensing valve assembly 100 prevents stagnation of the hot melt adhesive or other thermoplastic material whereby, in turn, charring of the same is effectively prevented. It is also noted that a plurality of suitable seal or O-ring members 290,292,294,296 are disposed at strategic locations within the solenoid-actuated hot melt adhesive or other thermoplastic material dispensing valve assembly 100 so as to effectively prevent the external leakage of any hot melt adhesive or other thermoplastic material out from the solenoid-actuated hot melt adhesive or other thermoplastic material dispensing valve assembly 100.

Lastly, when it is desired to terminate a particular hot melt adhesive dispensing cycle or operation, the controller 155 is operated so as to effectively terminate electrical power to the electromagnetic coil 136 of the electromagnetic solenoid assembly 106 and to provide electrical power to the electromagnetic coil 126 of the electro-magnetic solenoid assembly 104. Armature 224 will therefore be magnetically attracted toward the electromagnetic solenoid assembly 104, and the valve stem 218, having the ball valve 216 mounted thereon, will be moved from the rightwardly disposed position disclosed within FIG. 5 to the leftwardly disposed position disclosed within FIG. 6 whereby the ball valve 216 will be moved from its unseated or OPENED position to its seated or CLOSED position. It is noted that, in connection with such movement of the armature 224 toward the electromagnetic solenoid assembly 104, the gap 234 will effectively be diminished from its aforenoted maximum dimension of, for example, 0.017 inches (0.017"), to its minimum dimension of, for example, 0.009 inches (0.009"), while at the same time the gap 236 will be correspondingly increased or expanded. It is noted still further that as a result of, for example, gap 236 always being fluidically connected to the annular chamber 230 and the hot melt adhesive or other thermoplastic material inlet supply port 242, hot melt adhesive or other thermoplastic material will tend to enter gap 236 thereby negating any tendency of the armature 226 to remain at its rightwardmost position adjacent, for example, electromagnetic coil 136 due to suction, capillary, or similar fluid adhesion properties developed between armature 226 and electromagnetic solenoid assembly 106.

Furthermore, during the time that the armature 224 is undergoing such movement from right to left, the hot melt adhesive or other thermoplastic material, disposed within the gap 234, will effectively be squeezed or compressed. Such squeezing or compression of the fluid material effectively develops resistance forces tending to stop, decelerate, or dampen the leftward movement of the armature 224 toward its final position in order to permit the ball valve 216 to be disposed at its seated or CLOSED position. However, it is also noted that the provision of, for example, the annular cup-shaped recessed portion 256 within the armature 224 permits the hot melt adhesive or other thermoplastic material to be rapidly dispersed from the gap 234 whereby the armature 224 can in fact rapidly achieve its finalized position and without causing bounce of the ball valve 216 with respect to its valve seat 194. These controlled movements are desirable in order to achieve positive and accurate termination of the hot melt adhesive or other thermoplastic material dispensing, and as has also been noted hereinbefore, the coil spring 232 will then maintain the ball valve 216 seated upon its valve seat 194 once electrical power to the electromagnetic coil 126 has been terminated by the controller 155. Similar movement and fluid characteristics are of course true in connection with the movement of the armature 226 within its chamber 230 from left to right. It is also noted that the provision of the bores 254,258 within the armatures 224,226, the tapered structures of the armatures 224,226, and the provision of the annular, cup-shaped recessed portions 256,260 within the armatures 224, 226, in addition to their various aforenoted operational functions, reduces the mass of such armature structures 224,226 whereby the rapid movements of the same during the valve opening and valve closing cycles of the hot melt adhesive or other thermoplastic material dispensing operations can be assured.

Figure 7:
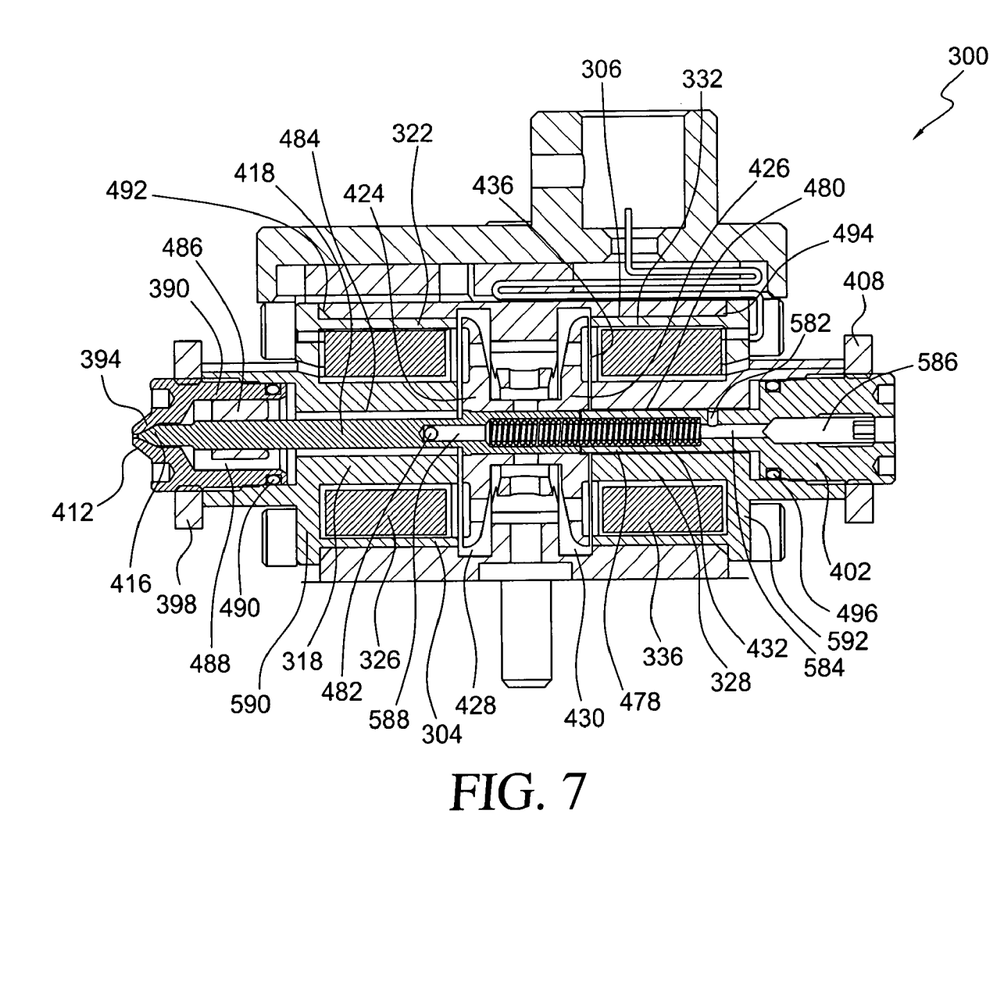
FIG. 7 is a partial cross-sectional view, similar to that of FIG. 5, wherein, however, a second embodiment of a new and improved dual inline solenoid-actuated hot melt adhesive or other thermoplastic material dispensing valve assembly, as constructed in accordance with the principles and teachings of the present invention, is illustrated.

With reference lastly being made to FIG. 7, a second embodiment of a new and improved dual inline solenoid-actuated hot melt adhesive or other thermoplastic material dispensing valve assembly, as has also been constructed in accordance with the principles and teachings of the present invention, is disclosed and is generally indicated by the reference character 300. It is to be appreciated that the second embodiment dual inline solenoid-actuated hot melt adhesive or other thermoplastic material dispensing valve assembly 300 is conceptually similar to the first embodiment dual inline solenoid-actuated hot melt adhesive or other thermoplastic material dispensing valve assembly 100, and therefore a detailed description of the second embodiment dual inline solenoid-actuated hot melt adhesive or other thermoplastic material dispensing valve assembly 300 will be omitted in the interest of brevity, the description of the second embodiment dual inline solenoid-actuated hot melt adhesive or other thermoplastic material dispensing valve assembly 300 being substantially confined to the structural differences between the first and second embodiment dual inline solenoid-actuated hot melt adhesive or other thermoplastic material dispensing valve assemblies 100,300. It is also noted that component parts of the second embodiment dual inline solenoid-actuated hot melt adhesive or other thermoplastic material dispensing valve assembly 300 which correspond to similar component parts of the first embodiment dual inline solenoid-actuated hot melt adhesive or other thermoplastic material dispensing valve assembly 100 will be designated by corresponding reference numbers except that they will be within the 300,400, and 500 series.

More particularly, one of the first structural differences existing between the first and second embodiment dual inline solenoid-actuated hot melt adhesive or other thermoplastic material dispensing valve assemblies 100,300 resides in the fact that, unlike the dispensing nozzle 212 comprising a separate component from the valve seat member 190, wherein the locknut 214 was required to secure the dispensing nozzle 212 upon the valve seat member 190, all in accordance with the principles and teachings of the structure comprising the first embodiment dual inline solenoid-actuated hot melt adhesive or other thermoplastic material dispensing valve assembly 100, the dispensing nozzle 412 of the second embodiment dual inline solenoid-actuated hot melt adhesive or other thermoplastic material dispensing valve assembly 300 has effectively been fabricated as an integral part of the valve seat member 390 thereby obviating the need for a separate locknut. In addition, it is also seen that, in lieu of the ball valve 216, as well as the axially oriented bore 210 extending between the valve seat 194 and the dispensing nozzle 212, as was characteristic of the structure comprising the first embodiment dual inline solenoid-actuated hot melt adhesive or other thermoplastic material dispensing valve assembly 100, the valve seat 394 of the valve seat member 390 of the second embodiment dual inline solenoid-actuated hot melt adhesive or other thermoplastic material dispensing valve assembly 300 is disposed immediately upstream of the dispensing nozzle 412, and that the ball valve 216 has effectively been replaced by means of a conically configured needle valve 416. It can therefore be appreciated that as a result of the provision of the conically configured needle valve 416 in lieu of the ball valve 216, and more particularly, in view of the fact that the conically configured needle valve 416 is disposed immediately upstream of the dispensing nozzle 412 whereby the axially oriented bore 210 of the first embodiment dual inline solenoid-actuated hot melt adhesive or other thermoplastic material dispensing valve assembly 100 is able to be eliminated, hot melt adhesive or other thermoplastic material is not able to accumulate, for example, within the axially oriented bore 210 whereby "stringing" of the hot melt adhesive or other thermo-plastic material, subsequent to the movement of the conically configured needle valve member 416 to its CLOSED position, is effectively prevented.

Continuing further, another primary difference between the structures respectively comprising the first and second embodiment dual inline solenoid-actuated hot melt adhesive or other thermoplastic material dispensing valve assemblies 100,300 resides in the structure comprising the valve stroke-adjustment stop member. More particularly, it will be recalled that the valve stroke-adjustment stop member 202, characteristic of the first embodiment dual inline solenoid-actuated hot melt adhesive or other thermoplastic material dispensing valve assembly 100 as illustrated within FIGS. 4 and 5, comprised the plurality of circumferentially spaced, axially extending projections 278 which effectively formed a recessed chamber within which the rear end portion of the coil spring 232 is seated, and wherein further, circumferentially spaced slots 280 were defined between the axially extending projections 278 so as to define fluid flow paths for the hot melt adhesive or other thermoplastic material from fluid chamber 230 and gap 236. To the contrary, in accordance with the principles and teachings of the second embodiment dual inline solenoid-actuated hot melt adhesive or other thermoplastic material dispensing valve assembly 300, the axially extending projections 278 and the plurality of circumferentially spaced slots 280 have been eliminated, and a cylindrically configured tubular portion 478 has been provided upon the forward end portion of the valve stroke-adjustment stop member 402.

It is seen that the axial length of the forwardly extending tubular portion 478 of the valve stroke-adjustment stop member 402 is substantially larger greater than the axial length defined by means of the axially extending projections 278 of the valve stroke-adjustment stop member 202, and accordingly, a greater axially extending portion of the coil spring 432 will be seated or accommodated within the internal bore of the forwardly extending tubular portion 478 of the valve stroke-adjustment stop member 402. In addition, it is seen that a plurality, for example, three, of circumferentially spaced, axially extending grooves 480 are defined within outer surface portions of the tubular portion 478, and that a plurality, for example, three, of circumferentially spaced, radially extending bores 582 are defined within the valve stroke-adjustment stop member 402 so as to be respectively fluidically connected at first end portions thereof to the plurality of axially extending grooves 480. A first axially extending fluid passageway 584 is effectively defined within a first axially extending bore formed within the valve stroke-adjustment stop member 402 so as to fluidically connect second end portions of the plurality of radially extending bores 582 with the bore within which the coil spring 432 is disposed, and a threaded set screw or plug 586 is disposed within the valve stroke-adjustment stop member 402 so as to close off the rear end portion of the bore within which the axially extending fluid passageway 584 is defined. In a similar manner, a second axially extending fluid passageway 588 is effectively defined within a second axially extending bore formed within the valve stem 418, and a plurality of circumferentially spaced apertures 482 are also defined within the valve stem 418 so as to fluidically connect the second axially extending fluid passageway 588 with the annular space 484 effectively surrounding the valve stem 418.

In this manner, when the valve stem 418 and the needle valve 416 thereof have been moved rearwardly to their OPEN positions, hot melt adhesive or other thermoplastic material, disposed within the gap 436, can flow through the plurality of axially extending grooves 480, into the radially extending bores 582, into the first axially extending fluid passageway 584, through the interior portion of the coil spring 432, through the second axially extending fluid passageway 588, out through the plurality of apertures 482, and into the annular space 484 surrounding the valve stem 418 so as to effectively combine with the other hot melt adhesive or other thermoplastic material fluid flows, as has been previously described in connection with the first embodiment dual inline solenoid-actuated hot melt adhesive or other thermoplastic material dispensing valve assembly 100, whereby such fluid flows can then be conducted into the internal chamber 488 defined within the valve seat member 390 such that the hot melt adhesive or other thermoplastic material can be discharged from the dispensing nozzle 412. It is also noted that the locations or positions of the various O-ring members 292, 294,296 of the first embodiment dual inline solenoid-actuated hot melt adhesive or other thermoplastic material dispensing valve assembly 100 have been relocated or repositioned in accordance with the principles and teachings of the second embodiment dual inline solenoid-actuated hot melt adhesive or other thermoplastic material dispensing valve assembly 300 as respectively illustrated at 492,494,496.

A last structural difference between the second embodiment dual inline solenoid-actuated hot melt adhesive or other thermoplastic material dispensing valve assembly 300 and the first embodiment dual inline solenoid-actuated hot melt adhesive or other thermo-plastic material dispensing valve assembly 100 resides in a modification of the structure comprising the electromagnetic solenoid assemblies 104,106 and the end plates 172,174 utilized in conjunction with the electromagnetic solenoid assemblies 104,106. More particularly, as can be appreciated from FIG. 7, in accordance with the structure of the second embodiment dual inline solenoid-actuated hot melt adhesive or other thermoplastic material dispensing valve assembly 300, in lieu of, for example, the use of the separate radially outer annular cover members 122,132 and the end plates 172,174, as illustrated within FIG. 1 in connection with the first embodiment dual inline solenoid-actuated hot melt adhesive or other thermoplastic material dispensing valve assembly 100, the radially outwardly extending annular flange portions 120,130 have effectively been combined with the end plates 172,174 so as to effectively form new end wall members 590,592 within the second embodiment dual inline solenoid-actuated hot melt adhesive or other thermoplastic material dispensing valve assembly 300, and in addition, it is seen that the new end wall members 590,592 also integrally connect together the radially inner, axially extending annular or tubular core portions 318,328 and the radially outer annular cover members or portions 322,332 into single or one-piece structures. Such modifications simplify the overall structure of the housing portions of the electromagnetic solenoid assemblies 304,306 within which the electromagnetic coils 326,336 are disposed.

Thus, it may be seen that in accordance with the teachings and principles of the present invention, there has been disclosed new and improved dual inline solenoid-actuated hot melt adhesive or other thermoplastic material dispensing valve assemblies which are actuated by means of a pair of oppositely disposed inline electromagnetic solenoid assemblies which respectively and alternatively act upon a pair of armatures which are fixedly mounted upon a valve stem upon which is fixedly attached a valve member. In this manner, the pair of electromagnetic solenoid assemblies can rapidly and assuredly control the reciprocal movements of the valve stem, and the valve member attached thereto, in order to rapidly and assuredly move the ball valve between its unseated or OPENED position and its seated or CLOSED position such that the dispensing valve assembly can control the discharge of the hot melt adhesive or other thermoplastic material through a hot melt adhesive or other thermoplastic material dispensing nozzle. A coil spring also biases the valve stem and the valve member toward the seated or CLOSED position such that when both of the electromagnetic solenoid assemblies are de-energized, the coil spring is just sufficiently strong so as to simply maintain the valve member at its seated or CLOSED position upon the valve seat. However, the biasing force of the coil spring mechanism is relatively small since it is not effectively utilized in connection with the movement of the valve stem, and the valve member, from the unseated or OPENED position to the seated or CLOSED position, so as not to adversely affect the movement of the armature and the valve stem when the valve member is to be moved from its seated or CLOSED position to its unseated or OPENED position. In addition, the positions of the armatures with respect to the electromagnetic solenoid assemblies can be accurately adjusted, as can the stroke movement of the valve stem and the valve member between the respective seated or CLOSED position and the unseated or OPENED position, so as to effectively optimize the operational cycles of the hot melt adhesive or other thermoplastic material dispensing valve assembly.

Obviously, many variations and modifications of the present invention are possible in light of the above teachings. It is therefore to be understood that within the scope of the appended claims, the present invention may be practiced otherwise than as specifically described herein.

What is claimed as new and desired to be protected by Letters Patent of the United States of America, is:

1. A fluid dispensing valve assembly, comprising:
   a dispensing nozzle for dispensing a fluid;
   a valve seat member having a valve seat defined thereon;
   a valve assembly, movably disposed with respect to said valve seat between first CLOSED and second OPENED positions, for controlling the flow of the fluid toward said dispensing nozzle; said valve assembly comprising a valve stem and a valve member disposed upon a first end portion of said valve stem for operatively cooperating with said valve seat of said valve seat member;

a first armature fixedly disposed upon a first portion of said valve stem so as to be disposed remote from said valve member disposed upon said first end portion of said valve stem;

a second armature fixedly disposed upon a second portion of said valve stem so as to also be disposed remote from said valve member disposed upon said first end portion of said valve stem and to also be spaced from said first armature fixedly disposed upon said valve stem;

a first electromagnetic solenoid assembly operatively connected to said first armature and said valve assembly for moving said first armature, said valve stem, and said valve member in a first direction with respect to said valve seat whereby said valve member will be disposed upon said valve seat and at said CLOSED position, when said first electromagnetic solenoid assembly is energized, so as to prevent the dispensing of the fluid from said dispensing nozzle;

a second electromagnetic solenoid assembly operatively connected to said second armature and said valve assembly for moving said second armature, said valve stem, and said valve member in a second opposite direction with respect to said valve seat, whereby said valve member will be unseated from said valve seat and disposed at said OPENED position, when said second electromagnetic solenoid assembly is energized, so as to permit the dispensing of the fluid from said dispensing nozzle;

a housing within which said first and second electromagnetic solenoid assemblies are mounted; and a stop member, adjustably mounted within said housing so as to engage said valve stem, when said valve stem is moved from said first CLOSED position to said second OPENED position, such that the stroke movement of said valve stem, and said valve member mounted thereon, between said first CLOSED position and said second OPENED position, is defined.

2. The fluid dispensing valve assembly as set forth in claim 1, wherein:

said first and second electromagnetic solenoid assemblies are operatively connected to said valve stem so as to move said valve stem, and said valve member mounted thereon, in a reciprocal manner and in said first and second directions, between said first CLOSED and second OPENED positions.

3. The fluid dispensing valve assembly as set forth in claim 2, wherein:

said first and second electromagnetic solenoid assemblies comprise first and second electromagnetic coils; and first and second armatures are fixedly mounted upon said valve stem so as to be respectively attracted to said first and second electromagnetic coils of said first and second electromagnetic solenoid assemblies when said first and second electromagnetic coils of said first and second electromagnetic solenoid assemblies are respectively energized so as to move said valve stem, and said valve member mounted upon said valve stem, between said first CLOSED and second OPENED positions.

4. The fluid dispensing valve assembly as set forth in claim 3, further comprising:

a spring, operatively interposed between said valve Stem and said stop member, for moving said valve stem, and said valve member mounted thereon, in said first direction toward said first CLOSED position so as to maintain said valve member at said first CLOSED position with respect to said valve seat when both said first and second electromagnetic coils are de-energized.

5. The fluid dispensing valve assembly as set forth in claim 4, wherein:

a first end portion of said spring is disposed within an internal bore portion of said valve stem and a second end portion of said spring is disposed within an internal bore portion of said stop member.

6. The fluid dispensing valve assembly as set forth in claim 1, wherein:

said valve seat member is threadedly mounted within a first end portion of said housing so as to adjustably position said valve stem, and said first and second armatures fixedly mounted upon said valve stem, within said housing whereby gaps between said first and second armatures, and said first and second electromagnetic solenoid assemblies, can be adjustably determined.

7. The fluid dispensing valve assembly as set forth in claim 4, further comprising:

a fluid inlet port defined within said housing for supplying the fluid, to be dispensed, into said housing; and first and second fluid chambers, defined within said housing and fluidically connected to said fluid inlet port so as to receive and contain portions of the fluid to be dispensed, within which said first and second armatures, fixedly mounted upon said valve stem, are disposed for effectively dampening reciprocal movements of said first and second armatures and therefore said reciprocal movements of said valve stem and said valve member mounted thereon.

8. The fluid dispensing valve assembly as set forth in claim 3, wherein:

said first and second electromagnetic solenoid assemblies have first radially inner annular portions disposed radially inwardly of said first and second electromagnetic coils so as to be surrounded by said first and second electromagnetic coils, and second radially outer annular portions disposed radially outwardly of said first and second electromagnetic coils so as to surround said first and second electromagnetic coils;

said first radially inner and second radially outer annular portions respectively having first and second predetermined end face areas which are substantially equal to each other; and said first and second armatures have first radially inner and second radially outer annular portions which respectively have first and second predetermined end face areas which are substantially equal to each other and which are substantially equal to said first and second predetermined end face areas of said first and second radially inner and radially outer annular portions of said first and second electromagnetic solenoid assemblies such that the flux density within said first and second radially inner and radially outer annular portions of said first and second electromagnetic solenoid assemblies, and within said first radially inner and second radially outer annular portions of said first and second armatures is substantially constant.

9. The fluid dispensing valve assembly as set forth in claim 8, wherein:

said first and second armatures comprise tapered structures such that said flux density within said first and second armatures is substantially constant throughout said first and second armatures.

10. The fluid dispensing valve assembly as set forth in claim 7, wherein:

said first and second armatures comprise annular recessed portions for dispersing fluid within said fluid chambers when said first and second armatures undergo said reciprocal movements.

11. The fluid dispensing valve assembly as set forth in claim 7, wherein:
said first and second armatures have fluid bores defined therein for fluidically connecting opposite sides of said first and second chambers.

12. The fluid dispensing valve assembly as set forth in claim 1, wherein:
said fluid dispensing valve assembly comprises a hot melt adhesive dispensing valve assembly.

13. The fluid dispensing valve assembly as set forth in claim 1, wherein:
said valve member comprises a ball valve.

14. The fluid dispensing valve assembly as set forth in claim 1, wherein:
said valve member comprises a conically configured needle valve.

15. The fluid dispensing valve assembly as set forth in claim 1, further comprising:
a fluid inlet port defined within said housing for supplying the fluid, to be dispensed, into said housing; and
first and second fluid chambers, defined within said housing and fluidically connected to said fluid inlet port so as to receive and contain portions of the fluid to be dispensed, within which said first and second armatures, fixedly mounted upon said valve stem, are disposed,
wherein, when said first electromagnetic solenoid assembly operatively is energized so as to move said valve member in said first direction to said first CLOSED position with respect to said valve seat, compression forces will be impressed upon the fluid disposed within said first fluid chamber such that said movement of said first armature will effectively be dampened so as to effectively prevent bounce of said valve member with respect to said valve seat.

16. The fluid dispensing valve assembly as set forth in claim 1, further comprising:
a fluid inlet port defined within said housing for supplying the fluid, to be dispensed, into said housing; and
first and second fluid chambers, defined within said housing and fluidically connected to said fluid inlet port so as to receive and contain portions of the fluid to be dispensed, within which said first and second armatures, fixedly mounted upon said valve stem, are disposed,
wherein, when said first electromagnetic solenoid assembly operatively is energized so as to move said valve member in said first direction to said first CLOSED position with respect to said valve seat, fluid from said fluid inlet port is able to enter said second fluid chamber so as to effectively negate adhesion forces that may otherwise be generated between said second armature and said second electromagnetic solenoid assembly so as not to prevent said movement of said first armature, said valve stem, and said valve member toward said CLOSED position.

17. The fluid dispensing valve assembly as set forth in claim 1, further comprising:
a fluid inlet port defined within said housing for supplying the fluid, to be dispensed, into said housing; and
multiple fluid pathways are defined around said valve stem so as to prevent charring of the fluid disposed within said housing prior to being dispensed from said dispensing nozzle.

18. The fluid dispensing valve assembly as set forth in claim 7, wherein:
at least fluid passageway is defined within said stop member; and
at least one fluid passageway is defined within said valve stem such that when the fluid is conducted into said housing and into said first and second fluid chambers, the fluid can enter said at least fluid passageway defined within said stop member, pass through said spring, and pass through said at least one fluid passageway is defined within said valve stem so as to be fluidically conducted toward said valve seat and said dispensing nozzle when said valve member has been unseated from said valve seat.

19. The fluid dispensing valve assembly as set forth in claim 1, wherein:
said dispensing nozzle and said valve seat member comprise a single one-piece integral component.

20. The fluid dispensing valve assembly as set forth in claim 1 further comprising:
spider structure disposed externally upon said valve stem for supporting said valve stem internally within said valve seat member and yet permitting the fluid to flow toward said valve seat and said dispensing nozzle when said valve member has been unseated from said valve seat.

* * * * *